United States Patent [19]

Wilke et al.

[11] 4,366,723
[45] Jan. 4, 1983

[54] RECIRCULATING-BALL DRIVE

[76] Inventors: Richard Wilke, Am Weissenfeld 4, 5830 Schwelm; Helmut Korthaus, Fernblick 3, 5600 Wuppertal 2, both of Fed. Rep. of Germany

[21] Appl. No.: 195,784

[22] Filed: Oct. 10, 1980

[30] Foreign Application Priority Data

Oct. 13, 1979 [DE] Fed. Rep. of Germany ....... 2941565

[51] Int. Cl.³ .......................... F16H 1/18; F16H 1/20
[52] U.S. Cl. ................. 74/424.8 R; 74/467; 74/216.3
[58] Field of Search ..... 74/216.3, 424.8 R, 424.8 NA, 74/424.8 C

[56] References Cited

U.S. PATENT DOCUMENTS 3,667,311 6/1972 Wysong ........................ 74/424.8 R
4,258,584 3/1981 Haegele et al. ............... 74/424.8 R

FOREIGN PATENT DOCUMENTS 721627 6/1976 U.S.S.R. ............................. 74/216.3
655849 11/1977 U.S.S.R. ........................ 74/424.8 R

Primary Examiner—Lawrence J. Staab
Assistant Examiner—Andrew Joseph Rudy
Attorney, Agent, or Firm—Montague & Ross

[57] ABSTRACT

A recirculating-ball drive has a ball nut centered on an axis and formed with an internal helical groove and receiving a spindle centered on the axis also and rotatable in the nut about the axis. This spindle is formed with an external helical groove of substantially the same pitch as the groove of the nut and having two turns interrupted by a substantially planar flat spaced radially outwardly of the axis. Faces of wedges bolted to the flat define thereon a pair of parallel guide surfaces which in turn define with the flat a passage extending between the interrupted turns of the spindle groove at an angle opposite the pitch angle of the spindle groove. An annular row of like balls fills the passage and the turn of the spindle groove interrupted at both ends by the flat.

9 Claims, 5 Drawing Figures

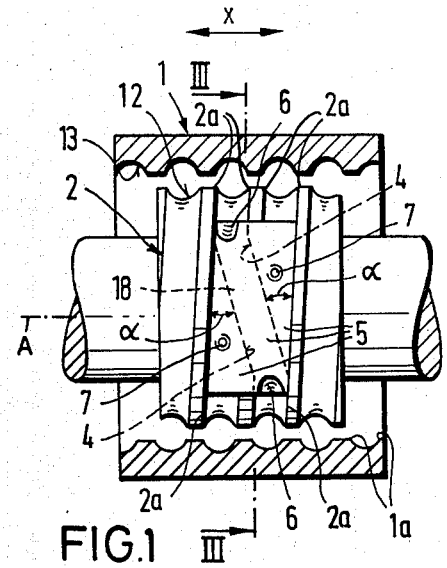
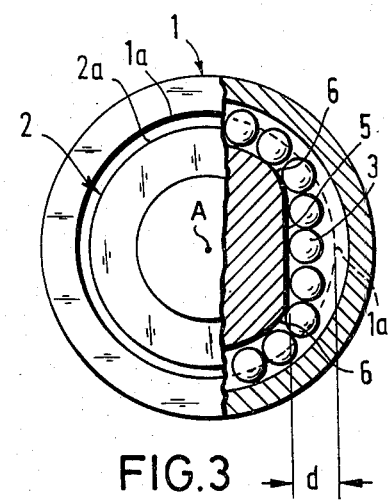
FIG.1  FIG.3
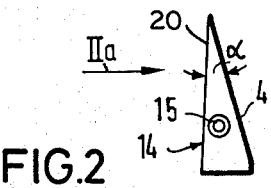
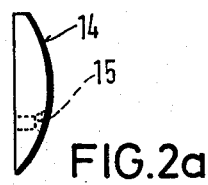
FIG.2  FIG.2a
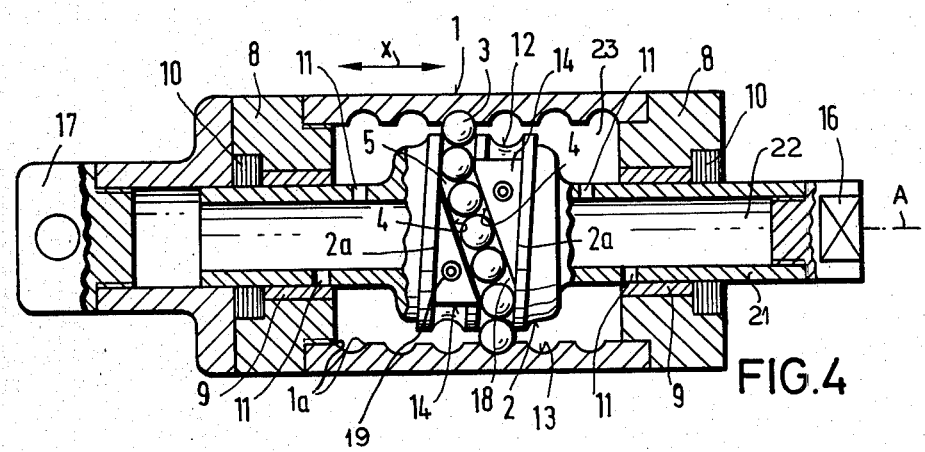
FIG.4

RECIRCULATING-BALL DRIVE

FIELD OF THE INVENTION

The present invention relates to a recirculating-ball drive.

BACKGROUND OF THE INVENTION

A recirculating-ball drive has a ball nut centered on an axis and formed with an internal helical groove. A spindle received in this nut is rotatable about the axis relative to the nut and is formed with an external helical groove of substantially the same pitch as the groove of the nut. An annular row of like balls is provided in these grooves and in a passage formed in the spindle or nut so that once a ball has traveled helically and axially in one direction through one or more turns it can recirculate in the opposite axial direction via the passage. The advantage of such systems is that relative rotation of the spindle and nut axially displaces these two parts relative to each other, with the axial force being transmitted through the balls which roll on the respective parts. Thus the system has an advantage over a simple spindle threaded into a nut that the sliding friction is replaced by the considerably smaller rolling friction.

Such systems are described in German published patent applications Nos. 2,451,665 and 2,741,333. In these systems the structure forming the above-described recirculation passage is relatively complex. As a result these recirculating-ball drives are rather expensive to manufacture. Furthermore the complexity of the recirculation passage creates frictional losses that substantially reduce the efficiency of the drive, that is the ratio of force which is not transmitted from input to output but which is lost in the drive to force transmitted.

OBJECTS OF THE INVENTION

It is therefore an object of the present invention to provide an improved recirculating-ball drive.

Another object is to provide such a drive which can be manufactured at low cost, yet which will have a long service life and high operating efficiency.

SUMMARY OF THE INVENTION

These objects are attained according to the instant invention in a recirculating-ball drive of the above-described general type, but wherein the spindle is formed with a substantially planar flat spaced radially outwardly of the drive axis and interrupting two adjacent turns of the groove of the spindle. Formations on the spindle at the flat define thereon a pair of parallel guide surfaces defining with the flat a passage extending between the turns of the flat but at an angle opposite the pitch angle of the helical turns of the nut and spindle. The annular row of like balls is in the grooves and passage.

Thus with the system according to the instant invention an extremely simple recirculation path is provided, with the balls simply moving radially inwardly and back on the flat so that they can recirculate in force-transmitting engagement with the grooves of the spindle and nut. The annular row of balls forms a single closed loop in axial engagement with the grooves over at least 250° to the loop, and lying in the passage for the balance of the 360°.

According to the instant invention the flat is notched out at each end of the passage so that as the balls circulate from the groove into the passage they can drop radially inwardly sufficiently to clear the flanks of the internal thread of the nut. Between the cut-out notches the flat is spaced radially inwardly from the innermost radially confronting portions of the nut by a distance at least equal to the diameter of the balls. This allows the balls to move backwardly against the pitch of the groove in the nut.

The structure according to the instant invention is extremely easy to manufacture. Once the spindle has been formed with a multiturn helical groove a flat is simply machined in it. Then wedges or blocks are bolted to this flat so that the edges of these blocks form the above-mentioned guide surfaces. Such a simple construction process makes it relatively easy to form the spindle even of the relatively hard steel of which such a spindle is normally formed. The nut, which is substantially more difficult to manufacture, has a simple throughgoing internal helical groove.

DESCRIPTION OF THE DRAWING

FIG. 1 is an axial section through a nut and spindle according to this invention;

FIG. 2 is a top view of a wedge block according to this invention;

FIG. 2a is a view of the wedge block taken in the direction of arrow IIa of FIG. 2;

FIG. 3 is an end view partly in axial section taken along line III of a spindle, nut, and ball according to the instant invention; and FIG. 4 is an axial section through a complete drive according to the present invention.

SPECIFIC DESCRIPTION

As seen in FIGS. 1 and 2 a recirculating ball drive according to this invention is centered on an axis A and has a tubular nut 1 formed with a throughgoing helical groove 13 having flanks 1a, and a spindle 2 having a helical groove 12 with flanks 2a. The spindle 2 is formed between two turns of the groove 12 with a planar flat 5 extending parallel to the axis A between the furthest flank 2a of one of the turns of the groove 12 and the axially furthest flank 2a of the adjacent turn of the groove 12. This flat 5 extends over an angle of approximately 90° relative to the axis A of the assembly as best seen in FIG. 3.

According to this invention wedge blocks 14 as shown in FIGS. 2 and 2a have outer edges 20 and inner edges 4 lying at an angle α here of approximately 20° to each other, an angle equal to approximately three times the pitch angle of the helical grooves 12 and 13. These blocks 14 are formed with throughgoing holes 15 alignable with threaded bores 7 in the planar surface of the flat 5 so that allen screws 19 can secure them to this planar flat 5 with their outer edges 20 in line with the respective flanks 2a and their inner edges 4 forming a ball-return passage 18 that extends here at an angle equal to approximately twice the pitch angle of the grooves 12 and 13, which is here approximately 7°. The flat 5 normally extends relative to the axis A over an angle of at least 75°, and can if necessary be made slightly radially outwardly convex, so long as the spacing d between it and the innermost portions of the nut is greater than the ball diameter. In addition the flat is notched out at 6 at the ends of the passage so that this radial spacing d is maintained even at the passage ends.

As seen in FIGS. 3 and 4 an annular row of like steel balls 3 fills 270° of one turn of the grooves 12 and 13 and the passage 18. These balls 3 therefore transmit axial forces between the spindle 2 and nut 1. When the spindle 2 is rotated with the nut 1 held nonrotatably, this nut will be displaced axially as shown by arrow x, or vice versa.

FIG. 4 shows how the ends of the nut 1 can be closed by end pieces 8 provided with sintered-bronze journals 9 for the spindle shaft 21, which is here tubular with a hollow interior 22. The nut 1 and end pieces 8 therefore form a closed chamber 23 which can communicate with the interior 22 via radially throughgoing holes 11 to each axial side of the center grooved portion of the spindle 2. This chamber 23 and the interior 22 are filled with a lubricant, with seals 10 preventing it from leaking out. The one end of the tubular shaft 21 is closed by an end piece 16 having a square recess for receiving a shaft, and the opposite end piece 8 is closed by a cap 17 formed with an eye. Thus as the spindle 2 and nut 1 move axially relative to one another, the lubricant will be force in and out through the holes 11, as the space between the end of the spindle 2 and the cap 17 will change in volume. This ensures continuous good lubrication of the drive according to the present invention.

The spindle according to the instant invention is very easily manufactured by first forming the helical groove 12, then milling in the flat 5 and notches 6. The wedge blocks 14, which are of the same high-quality steel as the spindle 2, are then bolted in place on the flat 5 to form the passage 18. Since the balls 3 merely recirculate through the passage 18 they subject the wedges 14 to very little axial force, so that these elements need not be extremely solidly mounted. When permanently lubricated as described above, the drive according to the instant invention is eminently suitable for use connecting a steering wheel to a pitman arm.

We claim:

1. A recirculating-ball drive comprising:
a ball nut centered on an axis and formed with an internal helical groove;
a spindle centered on said axis, rotatable thereabout relative to said nut, and formed with
an external helical groove of substantially the same pitch as said groove of said nut, and
a substantially planar flat, spaced radially outwardly of said axis and interrupting two adjacent turns of said groove of said spindle;
formations on said spindle at said flat defining thereon a pair of parallel guide surfaces defining with said flat a passage extending between the turns of said spindle but at an angle opposite the pitch angle of said turns; and
an annular row of like balls in said grooves and passage.

2. The drive defined in claim 1 wherein said spindle is further formed at each end of said passage with a cutout extending into the respective groove turn.

3. The drive defined in claim 1 wherein said surfaces are substantially perpendicular to said flat.

4. The drive defined in claim 1 wherein said drive includes respective blocks secured to said flat and forming said surfaces.

5. The drive definediin claim 4 wherein said blocks are made of substantially the same material as said spindle.

6. The drive defined in claim 1 wherein said spindle is formed at each end of said passage in said flat with a cutout extending into the respective groove turn, said passage having a floor formed by said cutouts and said flat between said surfaces which is spaced radially inwardly from said nut by a distance equal at least to the diameter of said balls.

7. The drive defined in claim 1 wherein said flat extends relative to said axis over at least 75° and said angle of said passage is at least twice said pitch angle.

8. The drive defined in claim 1, further comprising:
a pair of end pieces axially flanking said nut, axially slidably receiving said spindle, and forming with said nut a closed compartment containing said balls; and
a mass of fluid lubricant filling said compartment.

9. The drive defined in claim 8 wherein said spindle is tubular and open axially at one only end in one of said end pieces, said one end piece being formed with a blind bore receiving said one end, said spindle being formed with a radially throughgoing hole, said mass of lubricant filling the interior of said spindle, whereby as said spindle moves axially said lubricant is pumped through said hole.

* * * * *